July 24, 1923.
H. C. NEUBERGER
MACHINE FOR MOLDING BUILDING BLOCKS
Filed Sept. 30, 1922
1,462,614
2 Sheets-Sheet 2
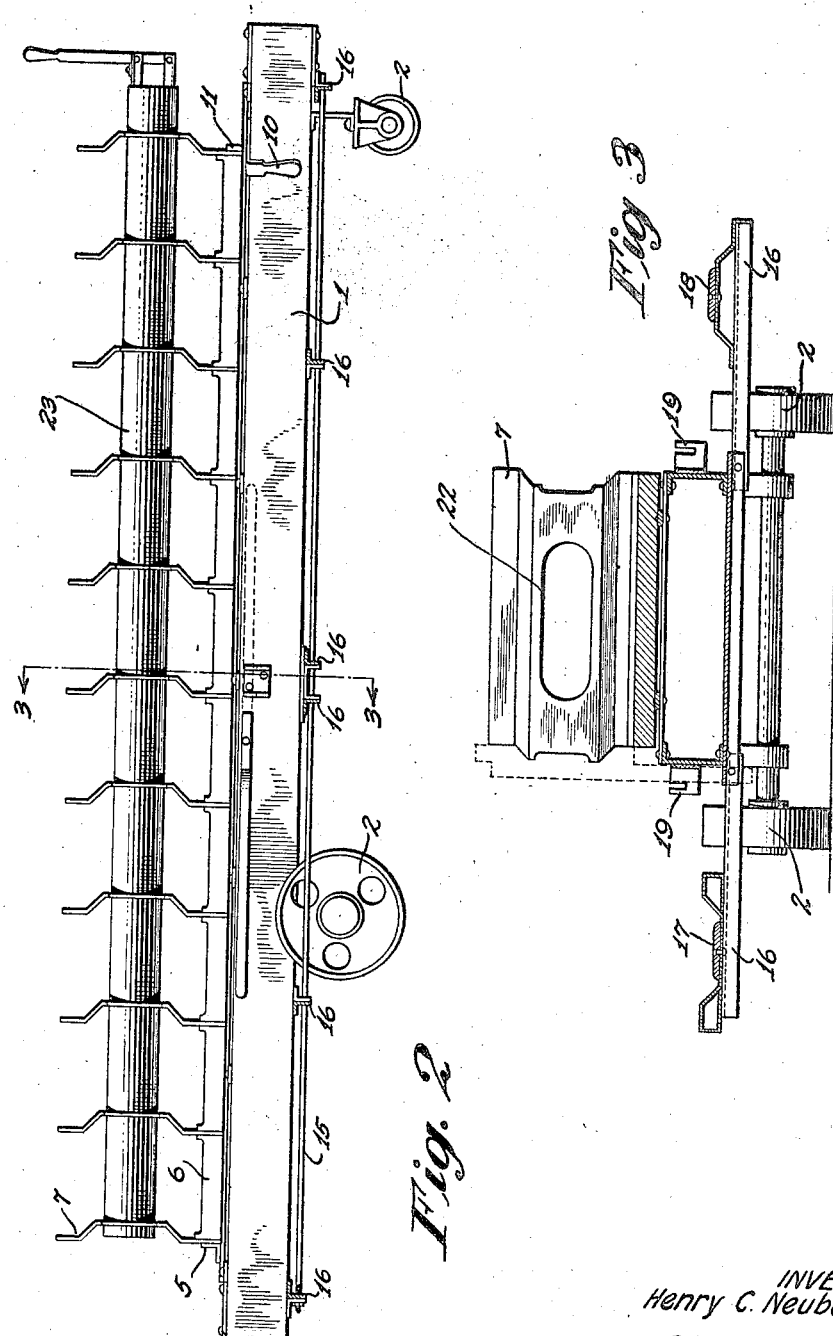
INVENTOR
Henry C. Neuberger
BY
Jas. H. Griffin
ATTORNEY Patented July 24, 1923.

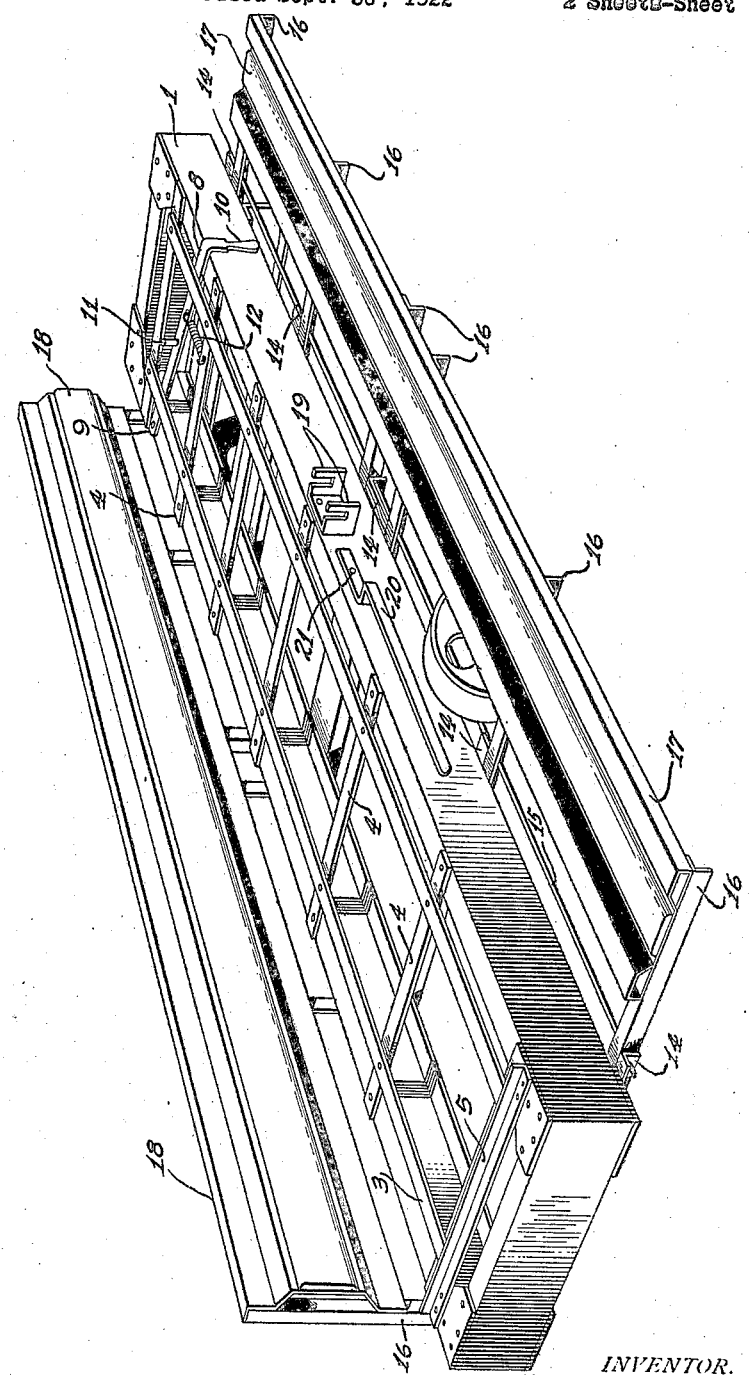

1,462,614

UNITED STATES PATENT OFFICE.

HENRY C. NEUBERGER, OF NEW YORK, N. Y., ASSIGNOR TO INTERLOCKING METAL FORMS CORPORATION, OF TUCKAHOE, NEW YORK, A CORPORATION OF NEW YORK.

MACHINE FOR MOLDING BUILDING BLOCKS.

Application filed September 30, 1922. Serial No. 591,442.

*To all whom it may concern:*

Be it known that I, HENRY C. NEUBERGER, a citizen of the United States, residing at New York city, county and State of New York, have invented a certain new and useful Machine for Molding Building Blocks, of which the following is a specification.

This invention is a machine for molding building blocks of cement, concrete or of any other material suitable for this purpose.

The object of the invention is to provide a compact machine for molding a plurality of blocks at one time in a simple and expeditious manner and so constructed that after the material from which the blocks are molded is more or less set, the blocks may be readily removed from the machine without damaging the blocks, so as to permit the machine to be used to mold a successive group of blocks without requiring delay in waiting for the blocks already in the machine to become cured before removal therefrom. The advantage of this arrangement is that delay in the molding of successive batches does not occur and the output of the machine is increased.

From a more specific standpoint, the invention relates to improvements in prior machines, which enable the present machine to be operated in a more neat and expeditious way and to minimize the time and labor of the work.

In this preferred practical embodiment, the machine of this invention comprises a wheeled platform or frame adapted to support thereon a plurality of face plates and along the lateral edges of the platform side walls are pivotally mounted which are adapted to be swung up into vertical position and locked in such position so as to mold the ends of a plurality of blocks. The locking means associated with these side walls is of simple, novel and efficient construction, affording rigid retainers for such walls, but adapted to expeditiously release the walls when the removal of the castings is desired. The long mold chamber formed between the face plates and the side walls is divided into a plurality of smaller mold chambers by partitions, each of which is clamped between two successive face plates and is thereby maintained in accurate spaced relation with reference to the next adjacent partitions.

With all these partitions and face plates cooperates a unitary clamping member, which is adapted, after the face plates and partitions have been brought into substantial position, to be operated to simultaneously clamp all of these parts together in accurately spaced relation. A core may or may not be employed, but if it is desired to use one, any suitable collapsible core is preferably used which is adapted to extend the full length of the machine and through appropriately shaped openings in the several partitions.

The configuration of the side walls is such as to produce a tile of novel construction and when a machine is constructed embodying the novel features of this invention, it is found to give highly satisfactory results, to expedite the molding of building blocks and to minimize the labor on the part of the workmen.

Features of the invention, other than those specified, will be apparent from the hereinafter detailed description and claims, when read in conjunction with the accompanying drawings.

The accompanying drawings illustrate one practical embodiment of the invention, but the construction therein shown, is to be understood as illustrative, only, and not as defining the limits of the invention.

Figure 1 is a perspective view of a machine embodying the present invention, showing all face plates and partitions removed and one of the side walls swung down.

Figure 2 is a side elevation of the machine showing both side walls swung down, but all of the partitions and face plates in position; and, Figure 3 is a transverse section of the machine, as shown in Figure 2.

The machine of this invention embodies a platform 1, which in the interest of economy and lightness is preferably constructed of channel iron and rendered portable by wheels 2. This construction enables the platform to be moved from place to place, such for example as from the casting room to the place where it is desired to store the tiles, so that after casting, the blocks may be removed from the machine in a convenient manner.

Extending longitudinally along the top of the platform are a plurality of bearers in the form of slats 3, which are supported at different points in the length of the machine on transverse slats 4, and adjacent one end of the machine is a transverse upstanding flange or abutment 5. The bearers 3 are adapted to support a plurality of face plates and partitions 6 and 7, respectively, which are alternately positioned on the bearers 3 to produce the assembly shown in Figure 2. That is to say, a partition 7 is first set on edge against the abutment 5 and thereafter face plates and partitions are alternately assembled until they extend substantially the full length of the machine.

Adjacent the opposite end of the machine from that which carries the abutment 5, a lever 8 is pivoted at 9, projects across the machine and is provided with a handle 10. The lever carries intermediate its ends an upstanding pin 11 and is normally oscillated into the direction of the abutment 5, by means of a coil spring 12, one end of which is secured to the lever and the other end to the next adjacent slat 5.

During the positioning of the face plates and partitions on the platform, the lever 8 is retracted against the tension of the spring 12. A suitable catch may be provided for this purpose. However, after all the partitions and face plates are in position, the lever is released and the spring 12, being quite strong, forces the pin 11 against the contiguous face of the adjacent end partition with the result that the pressure of the spring is transmitted throughout all partitions and face plates and they are rigidly and firmly clamped between the abutment 5 and the pin 11.

Extending transversely across the abutment of the platform are a plurality of beams 14, which project beyond the lateral edges of the platform and serve as a rigid support for two hinge rods 15. These rods extend the entire length of the platform, a short distance from the lateral edges thereof and parallel to such edges and form pivotal supports for a plurality of bars 16. The bars 16 at one side of the platform carry a side wall 17, while the corresponding bars at the other side of the platform carry a second side wall 18. The side walls 17 and 18 are adapted, because of the pivotal mountings described to be swung up into vertical parallel relation to form between them a mold cavity, which is divided into a plurality of smaller cavities by means of the partitions 7. It will be noted that the partitions 7 are so shaped that their opposite faces will mold complementary male and female projections and depressions in adjacent blocks and the side walls 17 and 18 are shaped, so that they will also form substantially complementary male and female projections and depressions in the ends of the blocks.

To this end, the side walls are, in practice, preferably formed from sheet metal and bent into suitable cross section embodying the male and female shapes and along the longitudinal medial line of each side wall is preferably secured or formed integral therewith, ribs 17' and 18'.

The opposite ends of the partitions are cut out, so that they will be complementary to the cross sectional shape of the side walls with which they cooperate, so that when said side walls are swung up into the dotted line position shown at the left in Figure 3, the inner face of each side wall will interfit with the contiguous edges of the several partitions.

In order that the side walls may be expeditiously and efficiently locked in upstanding position for the molding operation, I secure to each lateral edge of the platform, one or more slotted keepers 19 and adjacent such keepers I mount a latch 20 by pivoting it at 21. Each latch is so shaped that after the side walls have been swung up into vertical position, each latch may be swung over on its pivot 21, so as to bridge the two central bars 16 and engage the slots of the intermediate keepers 19 for the purpose of locking the side walls in upright position. This manner of locking the side walls in molding position is economical and efficient since a positive lock is obtained by a single simple mechanical movement. The locking means does not unduly encumber the machine and is removed from the castings operations so as not to interfere therewith. The bars 16 extend below the hinged rod 15 to such extent that when the sides are swung down, the projecting portions of the bars will engage with the under edge of the platform, as shown in Figures 1 and 3, and will serve to support the side walls in substantially horizontal position, so that the platform may be moved while the sides are down without said sides dragging on the ground.

In practice, the slots of the keepers 19 are preferably slightly inclined, so that when the latches 20 are forced thereinto, they will exert a wedging action for the purpose of forcing the side walls tightly against the contiguous ends of the partitions, so that when the face plates, partitions and side walls are in casting position, a plurality of blocks may be poured at one time. In practice, the material from which the blocks are cast is allowed to set, and thereafter the side walls are released and swung down. The partition adjacent the locking pin 11 is first removed and thereafter the block on the first face plate is removel while on such face plate, so that it may be handled in a relatively green condition.

The next partition is then removed and is directly followed by the next block at its respective face plate and so on until all of the blocks are removed. A new set of face plates with the same partitions as previously employed may be thereupon assembled on the machine for the next casting operation, while the blocks previously cast are allowed to weather on the face plates on which they were cast. This mode of procedure greatly facilitates operations and increases the output of the machine.

If it is desired to cast cored blocks, the several partitions may be provided with one or more openings 22, as shown in Figure 3 and a core 23, preferably of the collapsible type is adapted to extend through the openings of all of the partitions. Any suitable collapsible core may be employed and when used is removed as the first step in the removal of the blocks.

I have hereinbefore referred to the ribs or ridges 17' and 18' on the side walls. The purpose of these ridges is to provide reentrant portions in the opposite ends of the blocks cast in this machine, so that the blocks when interfitted in adjacent relation in the wall may form between successive blocks, openings adapted to be filled by concrete or plaster to serve the purpose of keys, as will be apparent to those skilled in the art.

In the foregoing detailed description, I have set forth the preferred embodiment of the invention and it will be noted that the machine comprises many features which expedite and facilitate the operations of the workmen in preparing the mold for casting and in the subsequent removal of blocks. The form of the invention shown is that which has been found to give thoroughly satisfactory results in practice, but the invention is to be understood as broadly novel as is commensurate with the appended claims.

Having thus fully described the invention, what I claim as new and desire to secure by Letters Patent is:

1. A building block casting machine embodying a platform provided at one end with an abutment, a plurality of face plates and partitions assembled on the platform at one side of the abutment, and spring actuated means for forcing all of the face plates and partitions in the direction of the abutment to clamp them between the abutment and the spring actuated means.

2. A building block casting machine embodying a platform provided at one end with a stop, a plurality of casting elements assembled on the platform, and spring actuated means for clamping the casting elements in assembled relation between the stop and said means.

3. A building block casting machine embodying a wheeled platform, a plurality of bars pivoted to the opposite lateral edges of the platform, and side wall members carried by said bars and adapted to be swung therewith into vertical molding position or to be swung in a horizontal position to permit the removal of blocks previously cast, said bars being constructed to engage with the platform for the purpose of supporting the bars and wall members free from the ground, when they are swung down, whereby the platform may be thereupon moved without causing the wall members or bars to scrape on the ground.

4. A building block casting machine embodying a wheeled platform, side bars pivoted along the lateral edges of the platform and near the bottom thereof, and wall members mounted on said bars for pivotal movement relative to the platform and adapted to be swung up into vertical casting position or swung down into substantially horizontal position to permit of the removal of previously cast blocks, the side bars being adapted to project beneath and engage with the under side of the platform when they are swung down to maintain said bars in substantially horizontal position and free from engagement with the ground, so that the platform may be moved without causing the side bars or wall members to scrape on the ground.

5. A building block casting machine embodying a platform, side members pivotally mounted on the platform and adapted to be swung up into casting position or to be swung down to permit of the removal of a previously cast block, a locking member mounted on each lateral edge of the platform, and a cooperating keeper also mounted on each lateral edge of the platform, whereby when the sides are swung up the locking members may be moved into cooperative relation with the keepers to lock the sides in upstanding position.

6. A building block casting machine embodying a platform, side members pivotally associated with both lateral edges of the platform and adapted to be swung up into casting position or swung down from casting position to permit of the removal of previously cast blocks, cooperating male and female locking means associated with each lateral edge of the platform and adapted when the sides are in casting position to engage therewith and wedge said sides toward one another.

7. A building block casting machine embodying a platform, side bars pivoted at the lateral edges of the platform, wall members carried by the respective side bars, a keeper associated with each lateral edge of the platform, and a pivoted latch also associated with each lateral edge, each latch being adapted, when the corresponding side bars are in casting position, to bridge a plurality of such bars and to engage with its keeper to lock the bars in casting position.

8. A building block casting machine embodying a platform, side bars pivoted at the lateral edges of the platform, wall members carried by the respective side bars, a keeper associated with each lateral edge of the platform, and a pivoted latch also associated with each lateral edge, each latch being adapted, when the corresponding side bars are in casting position, to engage with at least one of said bars and also with its keeper to lock the corresponding side bars in casting position.

In testimony whereof I have signed the foregoing specification.

HENRY C. NEUBERGER.